United States Patent
Oiwa et al.

(10) Patent No.: US 9,090,215 B2
(45) Date of Patent: Jul. 28, 2015

(54) HOLDING FIXTURE OR WIRE HARNESS BRANCH PART

(71) Applicant: Yazaki Corporation, Minato-ku, Tokyo (JP)

(72) Inventors: Kazuyuki Oiwa, Kosai (JP); Seiichi Sugimoto, Kosai (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 113 days.

(21) Appl. No.: 13/890,900

(22) Filed: May 9, 2013

(65) Prior Publication Data

US 2013/0256028 A1 Oct. 3, 2013

Related U.S. Application Data

(63) Continuation of application No. PCT/JP2011/075939, filed on Nov. 10, 2011.

(30) Foreign Application Priority Data

Nov. 10, 2010 (JP) .................................. 2010-252074

(51) Int. Cl.
| | |
|---|---|
| *B60R 16/02* | (2006.01) |
| *H02G 3/06* | (2006.01) |
| *H01B 13/012* | (2006.01) |

(52) U.S. Cl.
CPC .......... *B60R 16/0215* (2013.01); *H02G 3/0608* (2013.01); *H01B 13/01263* (2013.01)

(58) Field of Classification Search
CPC ............. B60R 16/0215; H02G 3/0608; H01B 13/01263

USPC ...................... 174/72 A, 72 C, 68.1
See application file for complete search history.

(56) References Cited

U.S. PATENT DOCUMENTS 4,918,261 A * 4/1990 Takahashi et al. ............ 174/135
5,394,502 A * 2/1995 Caron .......................... 385/134

(Continued)

FOREIGN PATENT DOCUMENTS

| CN | 2097458 U | 2/1992 |
| CN | 1164137 A | 11/1997 |

(Continued)

OTHER PUBLICATIONS

International Search Report issued in PCT/JP2011/075939 mailed Dec. 13, 2011.

(Continued)

*Primary Examiner* — Dhirubhai R Patel
(74) *Attorney, Agent, or Firm* — Banner & Witcoff, Ltd.

(57) ABSTRACT

A holding fixture of a wire harness branch part in which branch wires are branched in a direction which intersects trunk wires of the wire harness from the trunk wires, includes: a trunk wire guiding part which guides the trunk wires; and special wire branching and guiding parts which make special wires, which are wires among the branch wires whose minimum bending radius is restricted, to be curved in a direction which intersects the trunk wires, and guide the special wires, and the special wire branching and guiding parts are formed by arc-shaped walls which are concave when viewed from outside and which make the special wires to be curved with a predetermined radius of curvature and guide the special wires.

11 Claims, 11 Drawing Sheets

(56) References Cited

U.S. PATENT DOCUMENTS

| | | | |
|---|---|---|---|
| 6,037,543 A * | 3/2000 | Nicoli et al. | 174/72 R |
| 6,284,975 B1 * | 9/2001 | McCord et al. | 174/71 R |
| 8,507,794 B2 * | 8/2013 | Wada | 174/72 A |

FOREIGN PATENT DOCUMENTS

| | | |
|---|---|---|
| JP | H09-93752 A | 4/1997 |
| JP | 09-289718 | 11/1997 |
| JP | 11-150831 | 6/1999 |
| JP | 2000-236608 A | 8/2000 |
| JP | 2006-252965 A | 9/2006 |

OTHER PUBLICATIONS

Dec. 4, 2014—(CN) Notification of the First Ofice Action—App 201180054229.8, Eng Tran.
Feb. 10, 2015—(JP) Notification of Reasons for Refusal—App 2010-252074, Eng Tran.
Machine English Translation of JP2000-236608A.
Machine English Translation of JPH09-289718A.
Machine English Translation of JPH11-150831A.

* cited by examiner

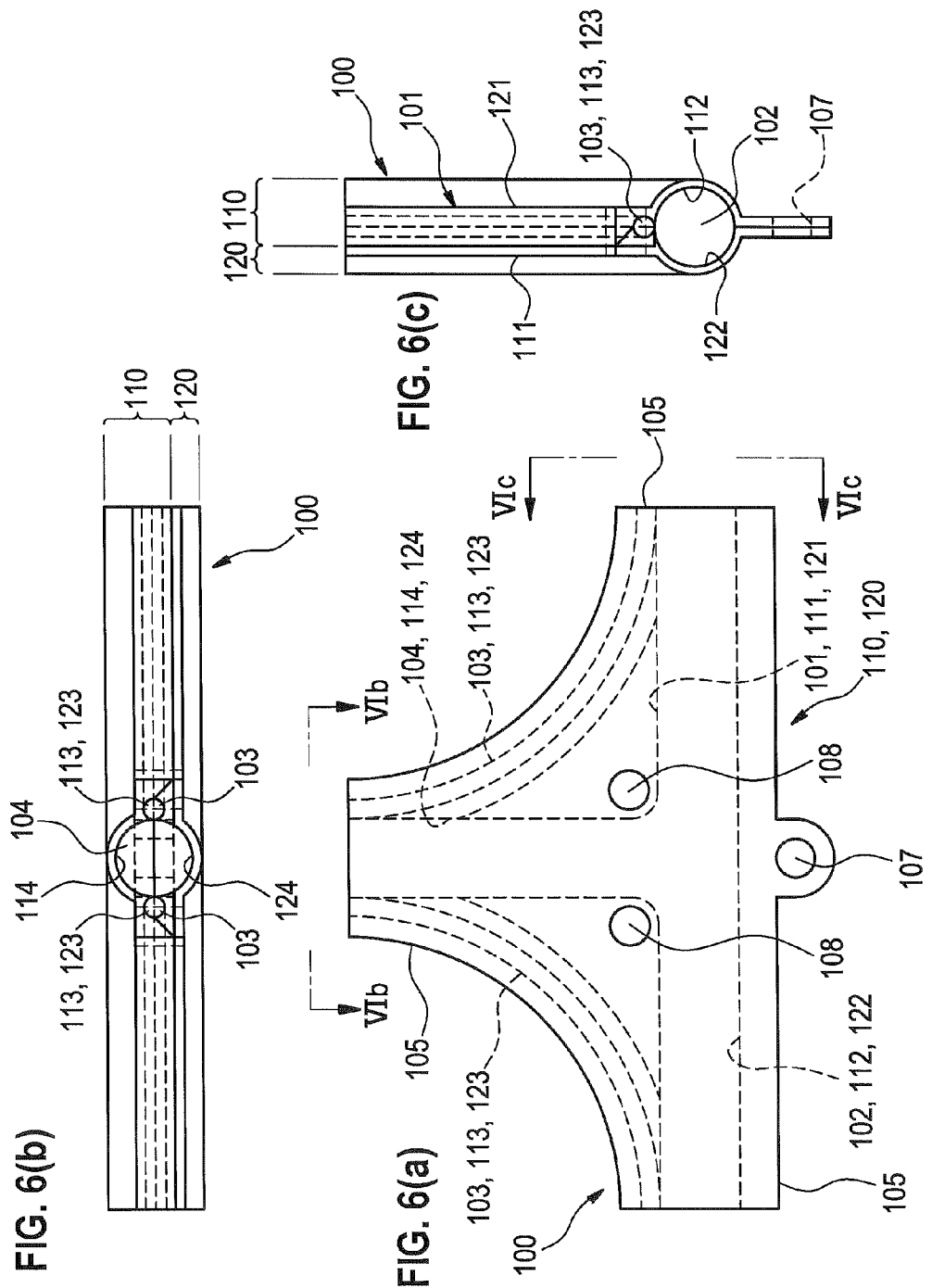

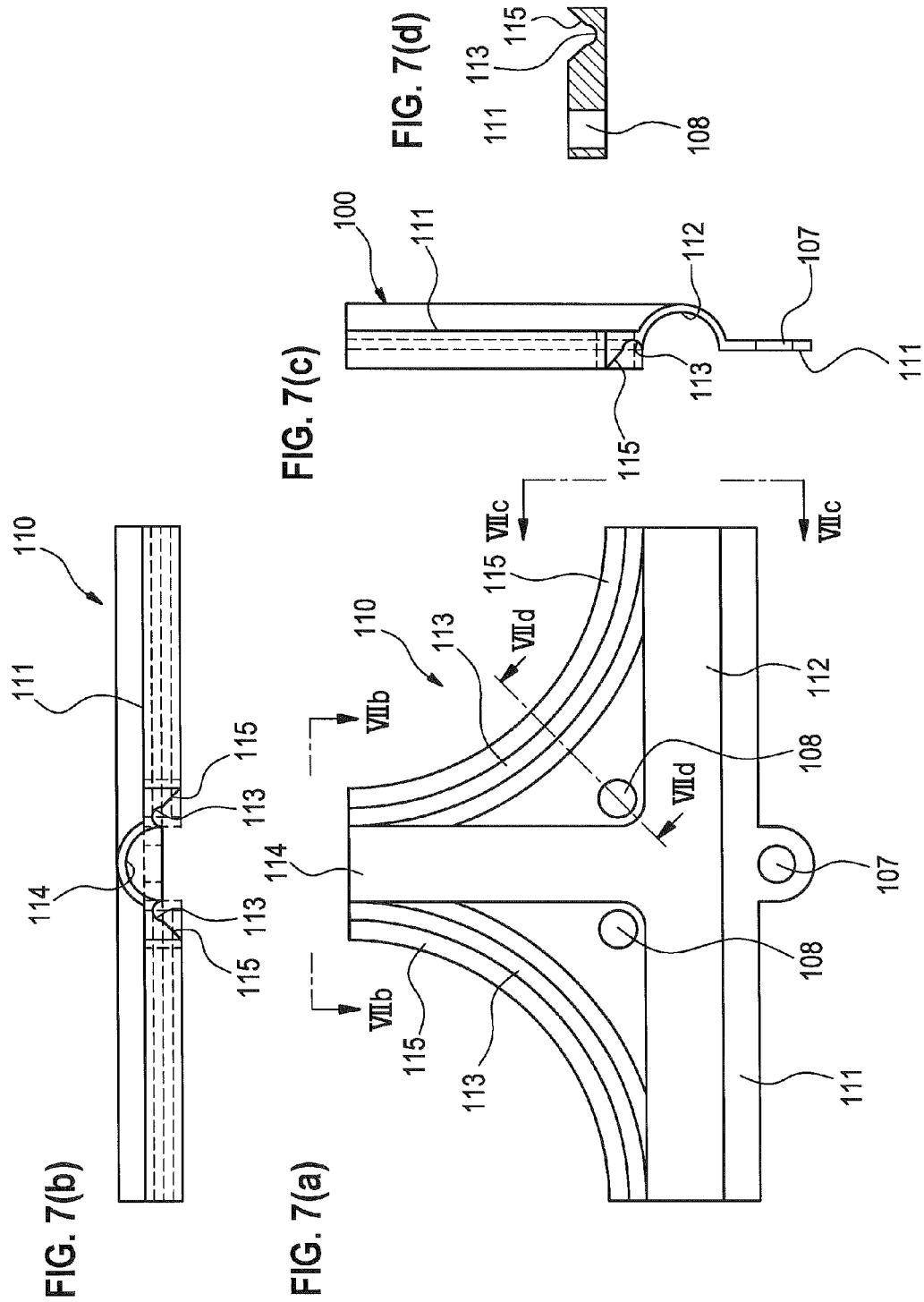

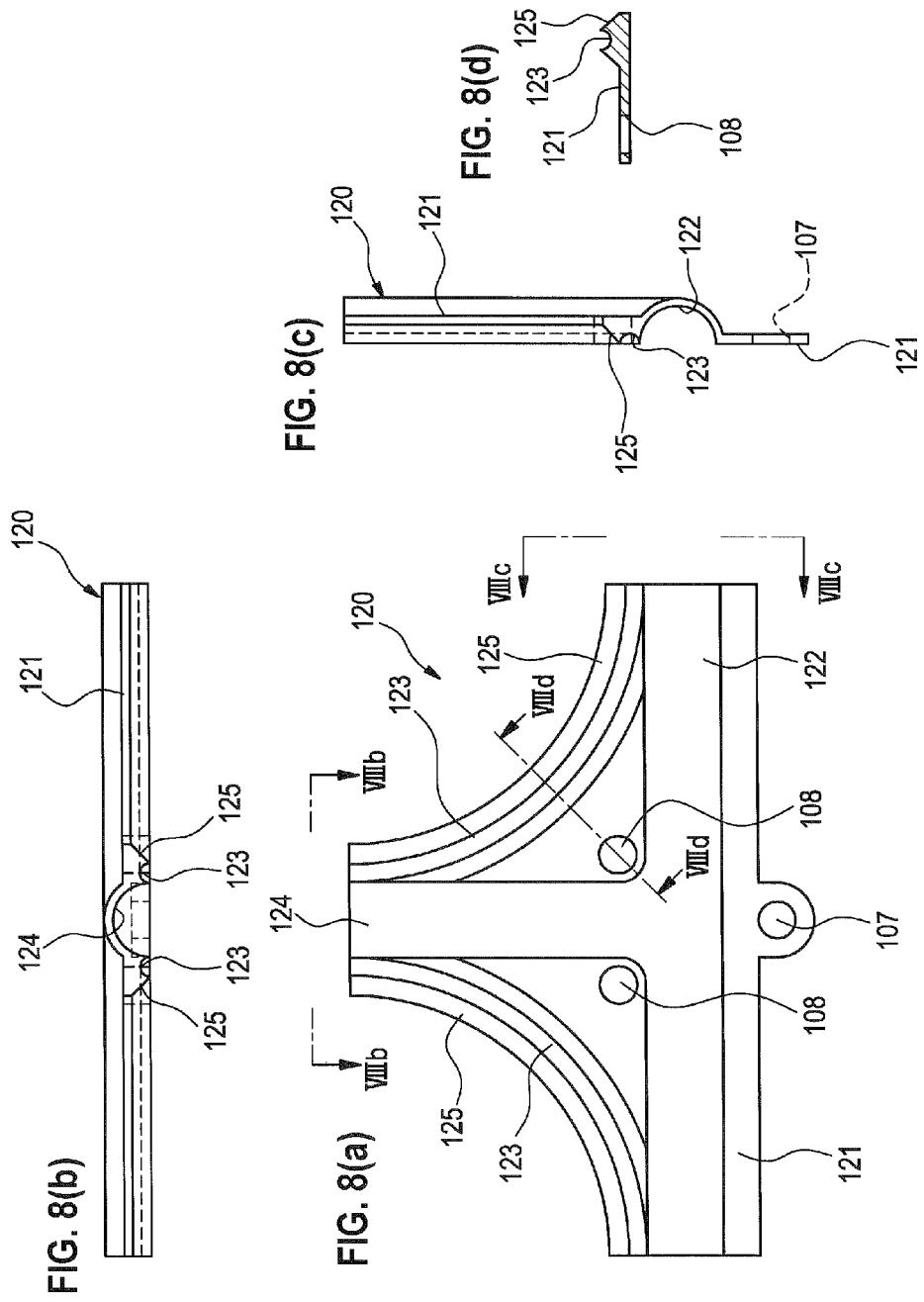

HOLDING FIXTURE OR WIRE HARNESS BRANCH PART

CROSS REFERENCE TO RELATED APPLICATION

This application is a continuation of PCT application No. PCT/JP2011/075939, which was filed on Nov. 10, 2011 based on Japanese Patent Applications No. 2010-252074 filed on Nov. 10, 2010, the contents of which are incorporated herein by reference.

TECHNICAL FIELD

The present invention relates to a holding fixture of a wire harness branch part in which branch wires are branched in a direction which intersects trunk wires of the wire harness from the trunk wires, and particularly to a holding fixture of the wire harness branch part when special wires (a coaxial cable, an optical cable, a tube, a twisted wire, a wire rope, etc.) whose minimum bending radius is restricted are contained in the branch wires.

BACKGROUND ART

When branch wires are drawn out from the trunk wires of a wire harness, usually, electric wires contained in the trunk wires (electric wires to be branched) are bent and drawn out in a direction which intersects the trunk wires (for example, a direction perpendicular to the trunk wires). When such a T-shaped wire harness branch part is manufactured, typically, the electric wires are wired by using a wiring plate and a wiring jig (for example, see a patent document 1).

FIG. 10 is a top view which shows that a T-shaped wire harness branch part is wired. In a wiring jig which is raised on a wiring plate, three cylindrical support posts 207, 208 and 208 are provided so that a trunk wire W1 can be supported and a branch wire W2 can be supported, and the trunk wire W1 and the branch wire W2 are wired in the shape of T along courses among the support posts 207, 208 and 208.

When a special wire Wt whose minimum bending radius is restricted to a large size (for example, several times its own diameter) besides an electric wire Ws which has usual flexibility is contained in the branch wire W2, since it is necessary to bend the special wire Wt while the minimum bending radius (also referred to as bending R) is secured (otherwise, the performance cannot be guaranteed), as shown in FIG. 11, the wiring is performed by newly attaching a jig 210 of a special curvature to the wiring plate.

PRIOR ART DOCUMENT

Patent document

[Patent Document 1] JP-A-2006-252965

SUMMARY OF THE INVENTION

Problems to be Solved by the Invention

However, when the wiring is performed by attaching the new jig 210 besides the usual wiring jig, there are problems that jigs crowd in the branch part, and it becomes difficult to perform a tape wrapping operation. Since the minimum bending radius of the special wire Wt is large, there is also a problem that it is hard to maintain such a state with tape wrapping.

Even when the wiring and the tape wrapping are performed on the wiring plate while the predetermined minimum bending radius is secured, it is feared that the bend radius might become smaller than the minimum bending radius in a middle stage until the wire harness is eventually assembled to a vehicle or the like, and a performance trouble might occur. When the wire harness is loaded onto a vehicle, in view of the manufacturing dimensional tolerance of the wire harness, the loading space has to be secured much larger than needed.

The present invention is made in view of the above-mentioned problems, and the purpose of the present invention is to provide a holding fixture of a wire harness branch part so that a wiring operation including tape wrapping can be easily performed, the wired state can be hold until a vehicle loading stage, and space efficiency can be improved.

Means for Solving the Problems

The above purpose of the present invention is attained by the following constructions.

(1) A holding fixture of a wire harness branch part in which branch wires are branched in a direction which intersects trunk wires of the wire harness from the trunk wires, comprising a trunk wire guiding part which guides the trunk wires, and special wire branching and guiding parts which make special wires, which are those wires among the branch wires whose minimum bending radius is restricted, to be curved in a direction which intersects the trunk wires, and guide the special wires, wherein the special wire branching and guiding parts are formed by arc-shaped walls which are concave when viewed from outside and which make the special wires to be curved with a predetermined radius of curvature and guide the special wires.

(2) The holding fixture of a wire harness branch part according to the above (1), wherein the special wire branching and guiding parts which guide the special wires so that the minimum bending radiuses become equal are provided at two sides of a line which intersects the trunk wire guiding part.

(3) The holding fixture of a wire harness branch part according to the above (1) or (2), wherein the arc-shaped walls are formed by at least one of inner surfaces and outer surfaces of arc-shaped board walls vertically provided on an upper surface of a board.

(4) The holding fixture of a wire harness branch part according to the above (1), wherein the arc-shaped walls are formed by inner surfaces of arc-shaped board walls vertically provided on an upper surface of a board, and a member which prevents the special wires which are wired along the inner surfaces of the arc-shaped board walls from moving to a direction of separating from the inner surfaces or a part where the member is to be placed is provided.

(5) The holding fixture of a wire harness branch part according to the above (1), comprising a board which has the trunk wire guiding part and the special wire branching and guiding parts, wherein the arc-shaped walls of the special wire branching and guiding parts are formed by wall surfaces of grooves which are provided at the board and extend along arc-shaped courses.

(6) The holding fixture of a wire harness branch part according to the above (5), wherein a straight groove which guides regular wires other than the special wires among the branch wires are provided as a regular wire branching and guiding part at the board.

(7) The holding fixture of a wire harness branch part according to the above (5) or (6), comprising a bottom plate and a top plate which form the board when being combined mutually, wherein trunk wire guding grooves which form a course of the trunk wire guiding part, and special wire branching and guiding grooves which form courses of the special wire branching and guiding parts, when the bottom plate and the top plate are combined, are formed on the bottom plate and the top plate, respectively, the special wire branching and guiding grooves of the bottom plate are formed at the lowest parts of V-shaped concave parts which are formed along the special wire branching and guiding grooves, and the special wire branching and guiding grooves of the top plate are formed at the highest parts of convex parts having angle structures which are formed along the special wire branching and guiding grooves and fit into the V-shaped concave parts when the bottom plate and the top plate are combined.

(8) The holding fixture of a wire harness branch part according to the above (5), wherein through holes, which position the board on a wiring plate by being fitted to a plurality of support posts of a wiring jig of the wire harness, respectively, are provided in the board.

According to the holding fixture of the wire harness branch part of the above (1), the arc-shaped walls are included as the special wire branching and guiding parts which make special wires, which are those wires among branch wires whose minimum bending radius is restricted, to be curved in a direction which intersects the trunk wires, and guide the special wires. Thus, by wiring the special wires, such as a coaxial cable or an optical cable, along the arc-shaped walls, it is possible to wire while the minimum bending radius is secured.

In addition, by wrapping tapes while the special wires are kept as they are, the wired state can be held in the minimum space. Therefore, while the wiring operation including the tape wrapping becomes easy, there is also no fear that the state at the time of wiring collapses before the wire harness is loaded onto a vehicle, and the loading space of the vehicle can also be reduced.

According to the holding fixture of the wire harness branch part of the above (2), the special wire branching and guiding parts which guide the special wires so that the minimum bending radiuses become equal are provided at two sides of a line which intersects the trunk wire guiding part. Thus, two systems of special wires can be branched by using both special wire branching and guiding parts.

According to the holding fixture of the wire harness branch part of the above (3), the arc-shaped walls are formed by at least one of the inner surfaces and the outer surfaces of arc-shaped board walls vertically provided on the upper surface of a board. Thus, depending on conditions, the inner surfaces, the outer surfaces, or both the inner surfaces and the outer surfaces of the arc-shaped board walls can be used separately.

According to the holding fixture of the wire harness branch part of the above (4), the arc-shaped walls are formed by the inner surfaces of arc-shaped board walls vertically provided on the upper surface of a board, and a member which prevents the special wires which are wired along the inner surfaces of the arc-shaped board walls from moving to a direction of separating from the inner surfaces or a part where the member is to be placed is provided. Thus, at the time of tape wrapping, the special wires can be prevented from separating from the arc-shaped surfaces to make it impossible to secure the minimum bending radius.

According to the holding fixture of the wire harness branch part of the above (5), the arc-shaped walls of the special wire branching and guiding parts which the board has are formed by wall surfaces of grooves which are provided at the board and extend along arc-shaped courses. Thus, by wiring the special wires, such as a coaxial cable or an optical cable, along the arc-shaped grooves, it is possible to wire while the minimum bending radius is secured.

In addition, by fixing the wire harness by wrapping tapes while the wire harness is kept as it is, the wired state can be held in the minimum space. Therefore, while the wiring operation becomes easy, there is also no fear that the state at the time of wiring collapses before the wire harness is loaded onto a vehicle, and the loading space of the vehicle can also be reduced.

According to the holding fixture of the wire harness branch part of the above (6), a straight groove which guides regular wires other than the special wires among the branch wires are provided as a regular wire branching and guiding part at the board. Thus, regular wires can be reasonably branched at the same time.

According to the holding fixture of the wire harness branch part of the above (7), since the top plate is put on the bottom plate and the top plate and the bottom plate are fixed after the wire harness is wired on the bottom plate, the wire harness branch part can be stably held. Since the special wire branching and guiding grooves of the bottom plate are formed at the lowest parts of the V-shaped concave parts and the special wire branching and guiding grooves of the top plate are formed at the highest parts of the convex parts having angle structures which fit into the V-shaped concave parts of the bottom plate, when the wire harness is wired on the bottom plate, and the top plate is put on the bottom plate after the wiring, the special wires can be automatically fitted in the special wire branching and guiding grooves along the slopes of the V-shaped concave parts, and the operation of wiring the special wires becomes easier.

According to the holding fixture of the wire harness branch part of the above (8), through holes, which position the board on a wiring plate by being fitted to a plurality of support posts of a wiring jig of the wire harness, respectively, are provided in the board. Thus, the operation of wiring the wire harness including the special wires can be performed by using the holding fixture and using the existing wiring jig.

BRIEF DESCRIPTION OF THE FIGURES

FIGS. 1(a) to 1(c) show the construction of a holding fixture of a first embodiment of the invention, in which FIG. 1(a) is a perspective view, FIG. 1(b) is a schematic top view which shows that special wires are wired while the inner surfaces of arc-shaped board walls are used as guiding surfaces, and FIG. 1(c) is a schematic top view which shows that special wires are wired while the outer surfaces of the arc-shaped board walls are used as guiding surfaces.

FIGS. 2(a) and 2(b) show the construction of a holding fixture of a second embodiment of the invention, in which FIG. 2(a) is a perspective view, and FIG. 2(b) is a schematic top view which shows that special wires are wired while the inner surfaces of arc-shaped board walls are used as guiding surfaces.

FIGS. 3(a) and 3(b) show the construction of a holding fixture of a third embodiment of the invention, in which FIG. 3(a) is a perspective view, and FIG. 3(b) is a schematic top view which shows that special wires are wired while the outer surfaces of arc-shaped board walls are used as guiding surfaces.

FIGS. 4(a) and 4(b) show the construction of a holding fixture of a fourth embodiment of the invention, in which FIG. 4(a) is a top view, and FIG. 4(b) is a schematic top view which shows that special wires are wired while the outer surfaces of arc-shaped board walls are used as guiding surfaces.

FIGS. 5(a) and 5(b) show the construction of a holding fixture of a fifth embodiment of the invention, in which FIG. 5(a) is a top view, and FIG. 5(b) is a side view.

FIGS. 6(a) to 6(c) show the construction of a holding fixture of a sixth embodiment of the invention, in which FIG. 6(a) is a top view, FIG. 6(b) is a VIb-VIb arrow view of FIG. 6(a), and FIG. 6(c) is a VIc-VIc arrow view of FIG. 6(a).

FIGS. 7(a) to 7(d) show the construction of a bottom plate which forms the holding fixture shown in FIGS. 6(a) to 6(c), in which FIG. 7(a) is a top view, FIG. 7(b) is a VIIb-VIIb arrow view of FIG. 7(a), FIG. 7(c) is a VIIc-VIIc arrow view of FIG. 7(a), and FIG. 7(d) is a VIId-VIId arrow sectional view of FIG. 7(a).

FIGS. 8(a) to 8(d) show the construction of a top plate which forms the holding fixture shown in FIGS. 6(a) to 6(c), in which FIG. 8(a) is a top view, FIG. 8(b) is a VIIIb-VIIIb arrow view of FIG. 8(a), FIG. 8(c) is a VIIIc-VIIIc arrow view of FIG. 8(a), and FIG. 8(d) is a VIIId-VIIId arrow sectional view of FIG. 7(a).

EMBODIMENTS FOR CARRYING OUT THE INVENTION

Below, the embodiments of the invention are described with reference to the figures.

[First Embodiment]

Figure 1A:
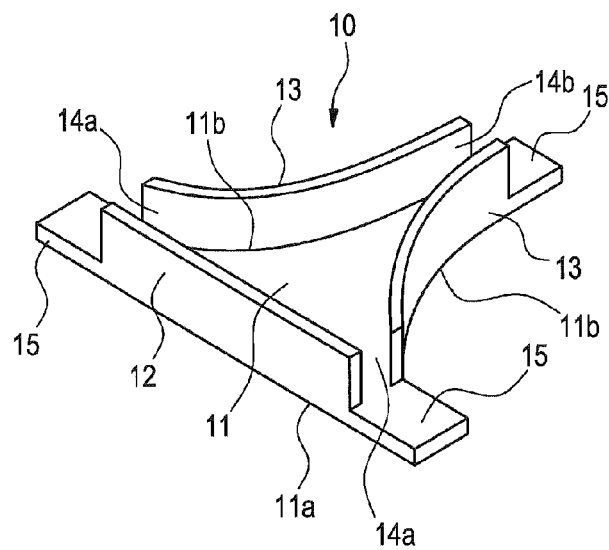
Figure 1B:
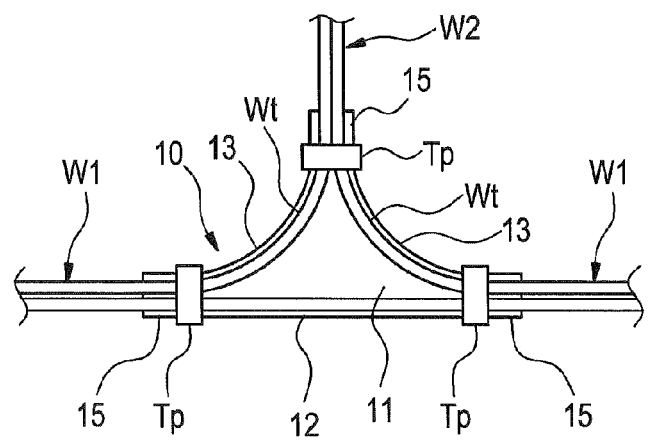
Figure 1C:
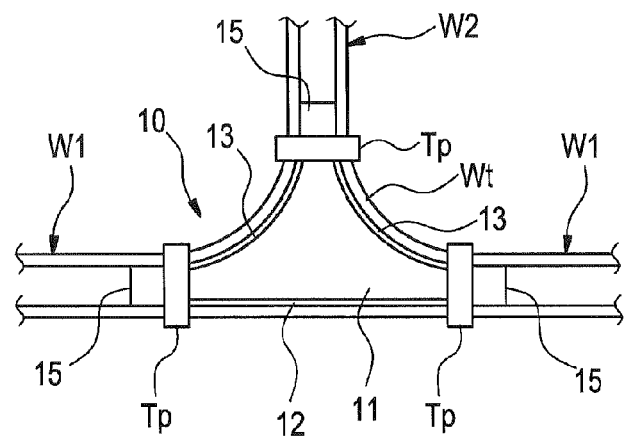

FIGS. 1(a) to 1(c) show the construction of a holding fixture 10 of a wire harness branch part of a first embodiment of the invention, in which FIG. 1(a) is a perspective view, FIG. 1(b) is a schematic top view which shows that special wires Wt are wired while the inner surfaces of arc-shaped board walls are used as guiding surfaces, and FIG. 1(c) is a schematic top view which shows that special wires Wt are wired while the outer surfaces of the arc-shaped board walls are used as guiding surfaces.

The holding fixture 10 of the wire harness branch part is a member for producing the T-shaped wire harness branch part in which branch wires W2 are branched in a direction which intersects trunk wires W1 of a wire harness (a direction perpendicular to the trunk wires W1 in the figure) from the trunk wires W1 and for holding the branch part in a produced state. The holding fixture 10 has a trunk wire guiding part 12 which guides the trunk wires W1, and special wire branching and guiding parts 13 which make the special wires Wt, which are those wires among the branch wires W2 whose minimum bending radius is restricted, to be curved in a direction which intersects the trunk wires W1, and guide the special wires Wt. Herein, the special wires Wt are mainly optical cables or coaxial cables, and also correspond to tubes, twisted wires, wire ropes and the like.

In the holding fixture 10 of this embodiment, the trunk wire guiding part 12 is formed by a straight board wall which is vertically provided on the upper surface of a plate-like board 11, and the special wire branching and guiding parts 13 are formed by at least one of the inner surfaces and the outer surfaces of arc-shaped board walls which are vertically provided on the upper surface of the board 11. The special wire branching and guiding parts 13 make the special wires Wt among the branch wires W2 to be curved with a predetermined minimum radius of curvature and guide the special wires Wt, and are formed as concave arc-shaped walls when viewed from outside.

In this case, the straight board wall which forms the trunk wire guiding part 12 is raised along a straight side edge part 11a of the board 11 which is equivalent to one long side of a rectangle. The arc-shaped board walls, which form the special wire branching and guiding parts 13, are provided in a right-left symmetric way at the two sides of a line perpendicular to the trunk wire guiding part 12, and are raised along arc-shaped side edge parts 11b and 11b of a ¼ circumference of a circle, which are made by cutting two end corners at the other long side of the rectangle, which is opposite to the one long side of the rectangle, into a ¼ round form. The height of the straight board wall which forms the trunk wire guiding part 12 and the height of the arc-shaped board walls which form the special wire branching and guiding parts 13 are set equally.

Between the distal ends of the straight board wall which forms the trunk wire guiding part 12 and the distal ends (in the curving direction) of the arc-shaped board walls which form the special wire branching and guiding parts 13, and between the right and left distal ends (in the curving direction) of the arc-shaped board walls which form the special wire branching and guiding parts 13, openings 14a, 14a and 14b through which electric wires pass are secured. Tape wrapped parts 15, which have the shape of a protruded piece, for tape wrapping and fixing the trunk wires W1 and the branch wires W2 are provided beyond those openings 14a, 14a and 14b by extending the board 11.

When the holding fixture 10 is used, the board 11 is placed, for example, on a wiring plate, and then a wiring operation is performed.

As shown in FIG. 1(b), when the wiring operation is performed, first, the trunk wires W1 of the wire harness are arranged along the inner surface of the straight board wall which forms the trunk wire guiding part 12. At this time, the two ends of the trunk wires W1 of the wire harness pass through the openings 14a and 14a between the distal ends of the straight board wall which forms the trunk wire guiding part 12, and the right and left distal ends in the curving direction of the arc-shaped board walls which form the special wire branching and guiding parts 13.

Next, in this state, the special wires Wt in the branch wires W2 which are branched from the trunk wires W1 are wired along the inner surfaces of the arc-shaped board walls which form the special wire branching and guiding parts 13, and are drawn out to the outside from the opening 14b between the distal ends of the arc-shaped board walls. Herein, although regular wires (ordinary electric wires which have flexibility so that the minimum bending radius is small) in the branch wires W2 are not mentioned, when there are regular wires, the regular wires are branched from the trunk wires W1 suitably, and drawn out to the outside from the same opening 14b.

In this state, the trunk wires W1 and the branch wires W2 are fixed to the holding fixture 10, respectively, by wrapping tapes Tp around the tape wrapped parts 15 provided beyond the three openings 14a, 14a and 14b. By the above, the T-shaped wire harness branch part held by the holding fixture 10 is completed.

It is described above that the trunk wires W1 and the branch wires W2 of the wire harness are wired along the inner surface of the straight board wall which forms the trunk wire guiding part 12 and the inner surfaces of the arc-shaped board walls which form the special wire branching and guiding parts 13. However, as shown in FIG. 1(*c*), the trunk wires W1 and the branch wires W2 of the wire harness can be wired along the outer surface of the straight board wall which forms the trunk wire guiding part 12 and the outer surfaces of the arc-shaped board walls which form the special wire branching and guiding parts 13. In this case, the wire harness branch part also can be fixed to the holding fixture 10 by wrapping tapes Tp using the tape wrapped parts 15.

In this way, by wiring the special wires Wt, whose minimum bending radius is restricted, among the branch wires W2 along the arc-shaped board walls used as the special wire branching and guiding parts 13, the wiring becomes possible while the minimum bending radius is secured. In addition, by wrapping the tapes Tp as they are, the wired state can be held in the minimum space in the range of the size of the holding fixture 10. Therefore, while the wiring operation including the tape wrapping becomes easy, there is also no fear that the state at the time of wiring collapses before the wire harness is loaded onto a vehicle, and the loading space of the vehicle can also be reduced.

In the holding fixture 10, since the special wire branching and guiding parts 13 are provided in a right-left symmetric way at the two sides of a line perpendicular to the trunk wire guiding part 12, it is possible to branch two systems of special wires Wt using both the special wire branching and guiding parts 13.

Since the tape wrapped parts 15 for the purpose of tape wrapping the special wires Wt are provide near the distal ends in the curving direction of the arc-shaped board walls which form the special wire branching and guiding parts 13, the tape wrapping operation can be performed certainly and easily.

Since the inner surfaces, the outer surfaces, or both of the inner surfaces and the outer surfaces of the arc-shaped board walls that form the special wire branching and guiding parts 13 can be separately used as guiding surfaces depending on conditions, the holding fixture 10 is user-friendly.

[Second Embodiment]

Figure 2A:
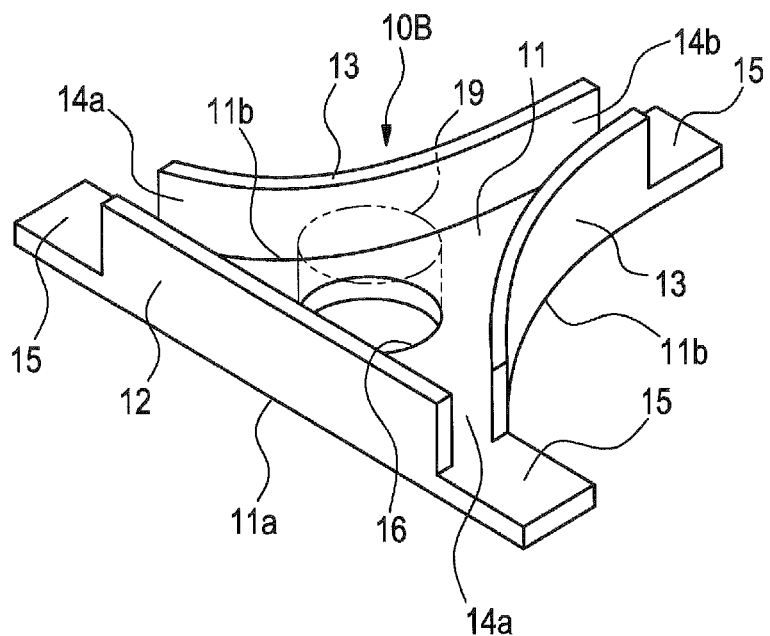
Figure 2B:
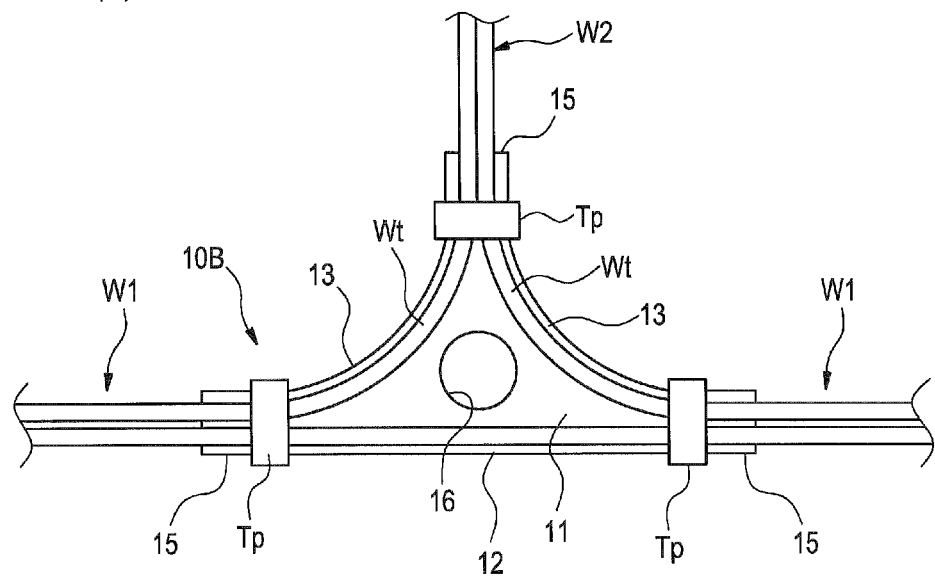

FIGS. 2(*a*) and 2(*b*) show the construction of a holding fixture 10B of the second embodiment, in which FIG. 2(*a*) is a perspective view, and FIG. 2(*b*) is a schematic top view which shows that special wires Wt are wired while the inner surfaces of arc-shaped board walls are used as guiding surfaces.

In the holding fixture 10B of the second embodiment, a circular hole 16 for placing another cylindrical jig (member) 19 is formed in the center of the board 11 of the holding fixture of the first embodiment. In the holding fixture 10B, the inner surface of the straight board wall which forms the trunk wire guiding part 12 and the inner surfaces of the arc-shaped board walls which form the special wire branching and guiding parts 13 are used as guiding surfaces when electric wires are wired. By placing the cylindrical jig 19 into the circular hole 16, the electric wires which are wired along the inner surfaces of the straight board wall or the arc-shaped board walls can be prevented from moving in a direction of separating from the inner surfaces.

Therefore, at the time of tape wrapping, the special wires Wt can be prevented from separating from the inner surfaces of the arc-shaped board walls which form the special wire branching and guiding parts 13 to make it impossible to secure the minimum bending radius. The cylindrical jig 19 will be removed if the tape wrapping is completed. By doing so, the holding fixture 10B can be kept lightweight.

As long as the function of preventing that the special wires Wt slackens before the stage of the tape wrapping after the wiring is performed, the cylindrical jig 19 can be replaced with members of other shapes which performs the same function. In that case, the shape of the circular hole 16 where the member is to be placed may be changed. Although the lightweight may be sacrificed to some extent, the cylindrical jig 19 or the member that replaces the cylindrical jig 19 may be provided to be fixed to the board 11.

[Third Embodiment]

Figure 3A:
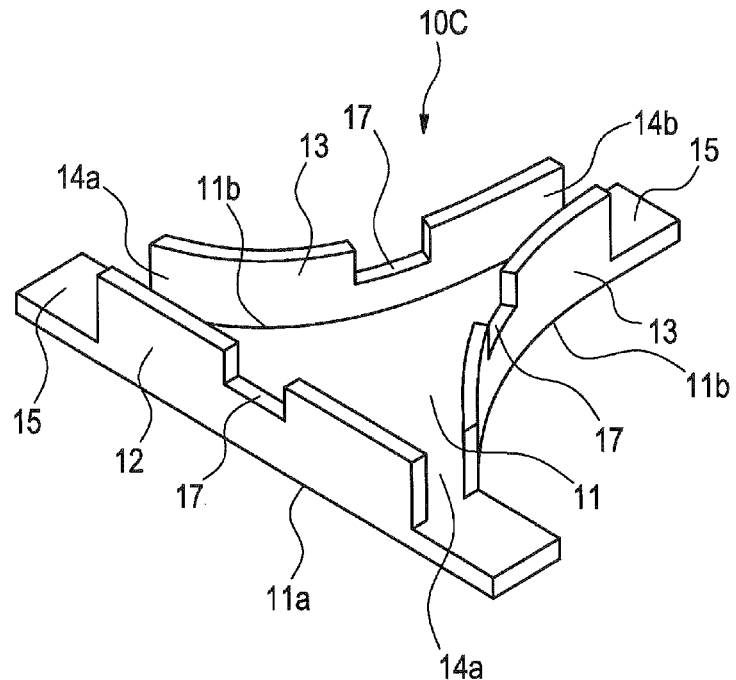
Figure 3B:
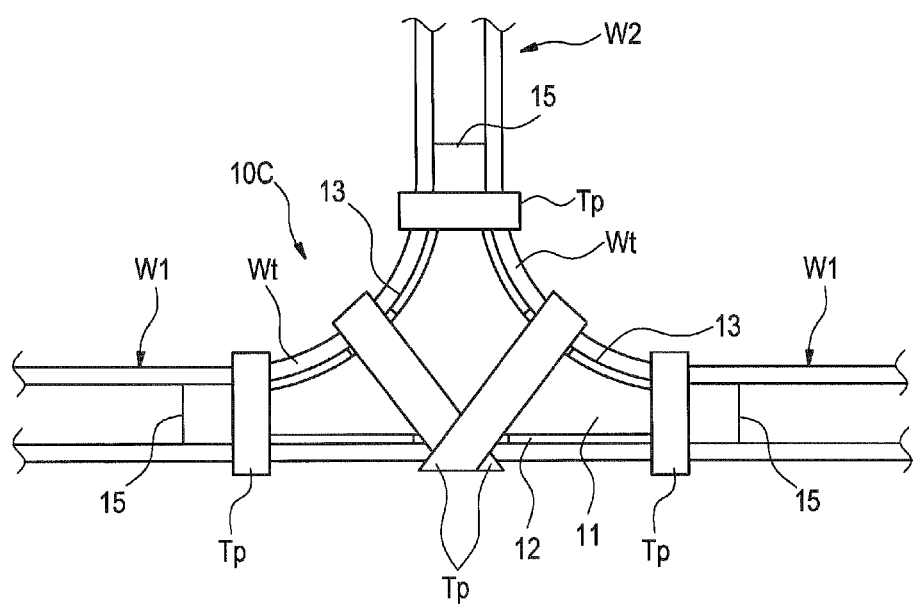

FIGS. 3(*a*) and 3(*b*) show the construction of a holding fixture 10C of the third embodiment, in which FIG. 3(*a*) is a perspective view, and FIG. 3(*b*) is a schematic top view which shows that special wires Wt are wired while the outer surfaces of arc-shaped board walls are used as guiding surfaces.

In the holding fixture 10C of the third embodiment, cuts which are used as tape catching parts 17 are formed on the upper edge of the straight board wall which forms the trunk wire guiding part 12 and the upper edges of the arc-shaped board walls which form the special wire branching and guiding parts 13 of the holding fixture of the first embodiment. The tape catching part 17 is provided at the central part in the length direction of the upper edge of the board wall, and the catching parts 17 of the arc-shaped board walls which form the special wire branching and guiding parts 13 are located at the central parts in the curving direction of the arc-shaped board walls.

When the holding fixture 10C is used, electric wires are wired while the outer surface of the straight board wall which forms the trunk wire guiding part 12, and the outer surfaces of the arc-shaped board walls which form the special wire branching and guiding parts 13 are used as guiding surfaces. Before the trunk wires W1 and the branch wires W2 are tape wrapped at the openings 14*a*, 14*a* and 14*b*, by using the catching parts 17, tapes Tp are wound around the holding fixture 10C in a cross-coupled way in advance to prevent slack of the special wires Wt, so that the special wires Wt will not separate from the outer surfaces of the arc-shaped board walls. In this state, the trunk wires W1 and the branch wires W2 are tape wrapped and fixed at the openings 14*a*, 14*a* and 14*b*.

Thus, since the tapes Tp are caught to the catching parts 17 provided on the upper edges of the board walls and the tape wrapping is performed, the special wires Wt can be pressed on the outer surfaces of the arc-shaped board walls while displacement of the tapes Tp can be prevented, and excessive slack can be avoid at the time of wiring.

[Fourth Embodiment]

Figure 4A:
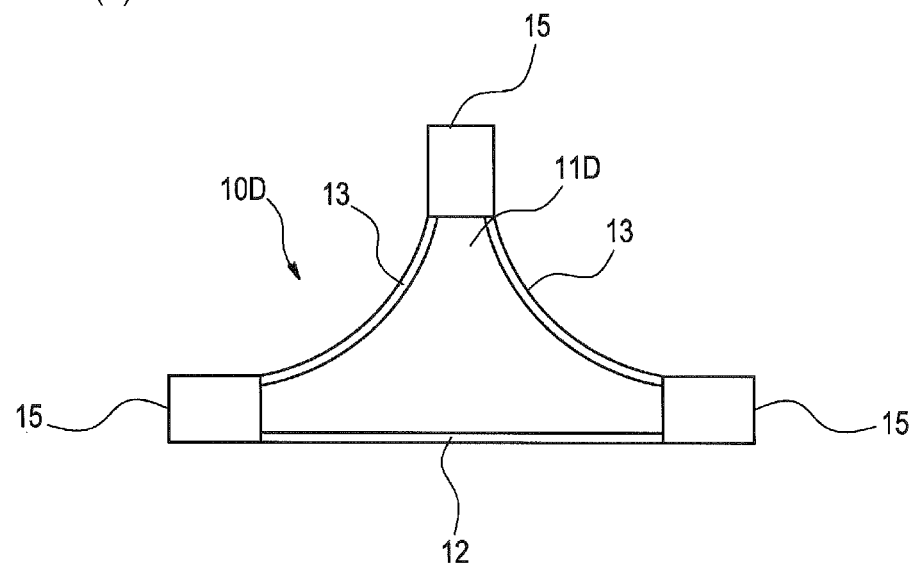
Figure 4B:
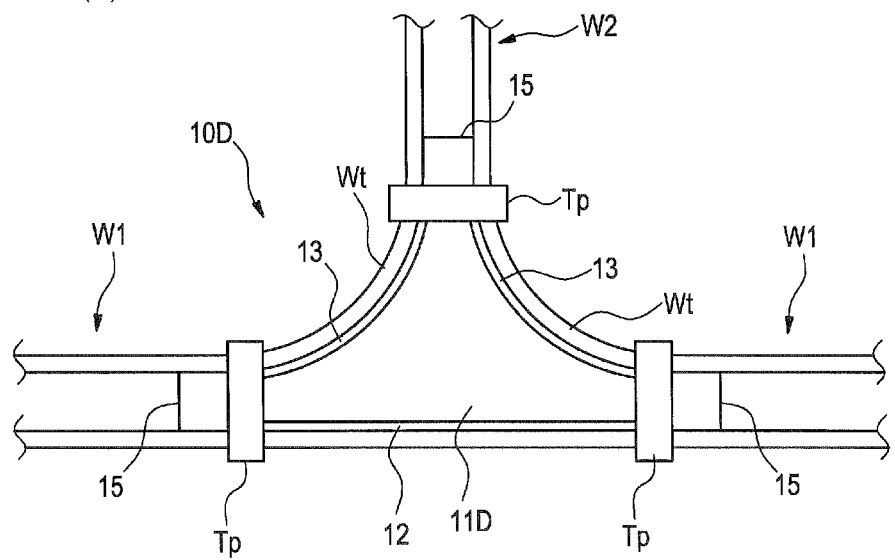

FIGS. 4(*a*) and 4(*b*) show the construction of a holding fixture 10D of the fourth embodiment, in which FIG. 4(*a*) is a top view, and FIG. 4(*b*) is a schematic top view which shows that special wires Wt are wired while the outer surfaces of arc-shaped board walls are used as guiding surfaces.

As can be seen from the figures of the previous embodiments, when electric wires are wired while the outer surface of the straight board wall which forms the trunk wire guiding part 12, and the outer surfaces of the arc-shaped board walls which form the special wire branching and guiding parts 13 are used as guiding surfaces, the inside spaces of the holding fixtures are not used. Thus, in the holding fixture 10D of the fourth embodiment, such an inside space is eliminated.

In the holding fixture 10D, a thick plate-like board 11D is formed into the same shape as the planar shape of the holding fixture of the first embodiment, and the peripheral end surfaces of the board 11*d* are used as the straight wall which forms the trunk wire guiding part 12 and the arc-shaped walls which form the special wire branching and guiding parts 13.

Thus, only tape wrapped parts 15 at the distal ends are formed into a thin plate-like shape so that it is easy to wrap tapes.

According to this holding fixture 10D, like the case where electric wires are wired along the outer surfaces of the board walls of the holding fixture of the first embodiment, the same effects can be obtained.

[Fifth Embodiment]

Figure 5A:
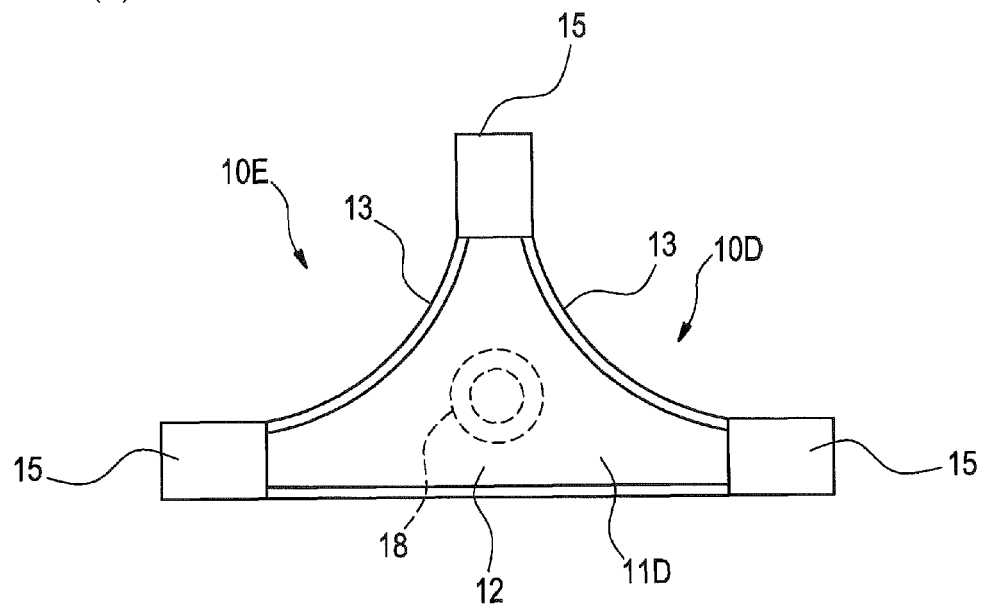
Figure 5B:
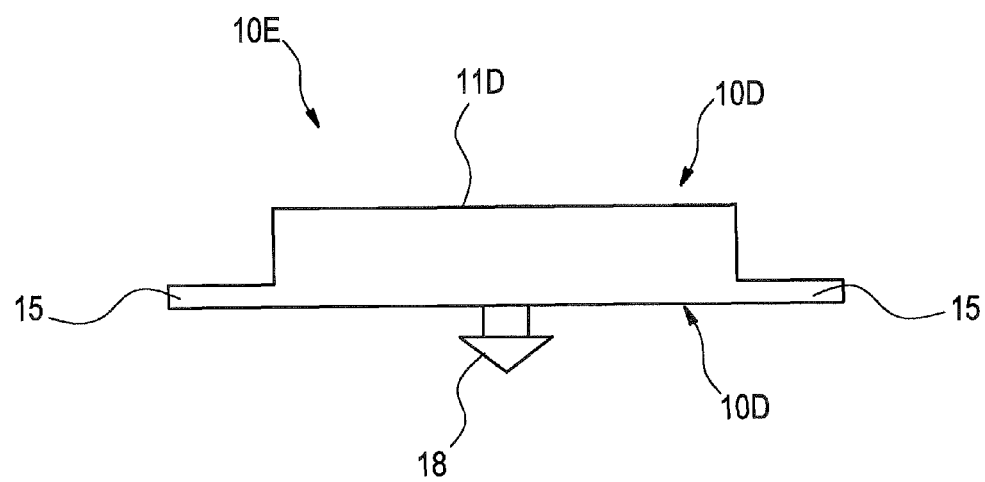

FIGS. 5(a) and 5(b) show the construction of a holding fixture 10E of the fifth embodiment of the invention, in which FIG. 5(a) is a top view, and FIG. 5(b) is a side view.

In this holding fixture 10E, a clip (fixing means) 18 which is to be engaged with and fixed to a fixing hole of a vehicle body panel (attached member) is protruded from the lower surface of the holding fixture 10D of the fourth embodiment. When the clip 18 is engaged with the fixing hole of the vehicle body panel at the time of vehicle loading, the holding fixture 10E for holding a T-shaped wire harness branch part can be fixed so that the holding fixture 10E will not be shaky on the vehicle body.

Therefore, although not fixing onto a vehicle sufficiently is a cause of abnormal sound generation, by eliminating the cause, the abnormal sound generation can be prevented.

The clip (fixing means) 18 also can be attached to the holding fixture 10 of the first embodiment, or the holding fixtures 10B and 10C of the second and the third embodiments, and the same effect can be obtained.

[Sixth Embodiment]

Figure 9:
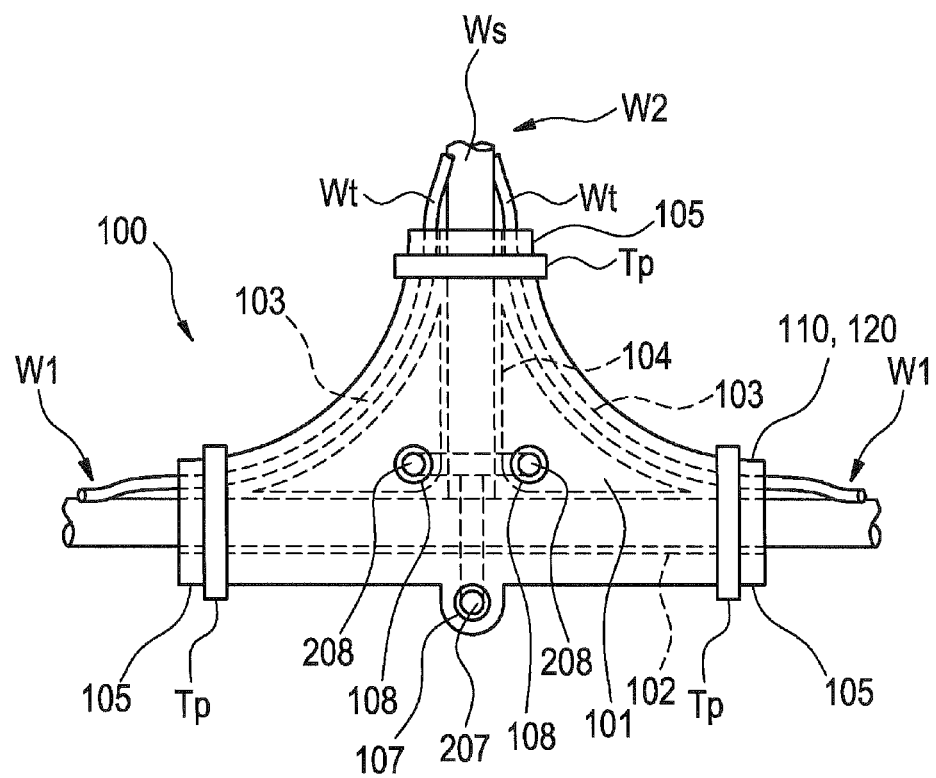
FIG. 9 is a top view which shows that by using the holding fixture shown in FIGS. 6(a) to 6(c) to perform the wiring of a wire harness, a T-shaped branch part is formed.
Figure 10:
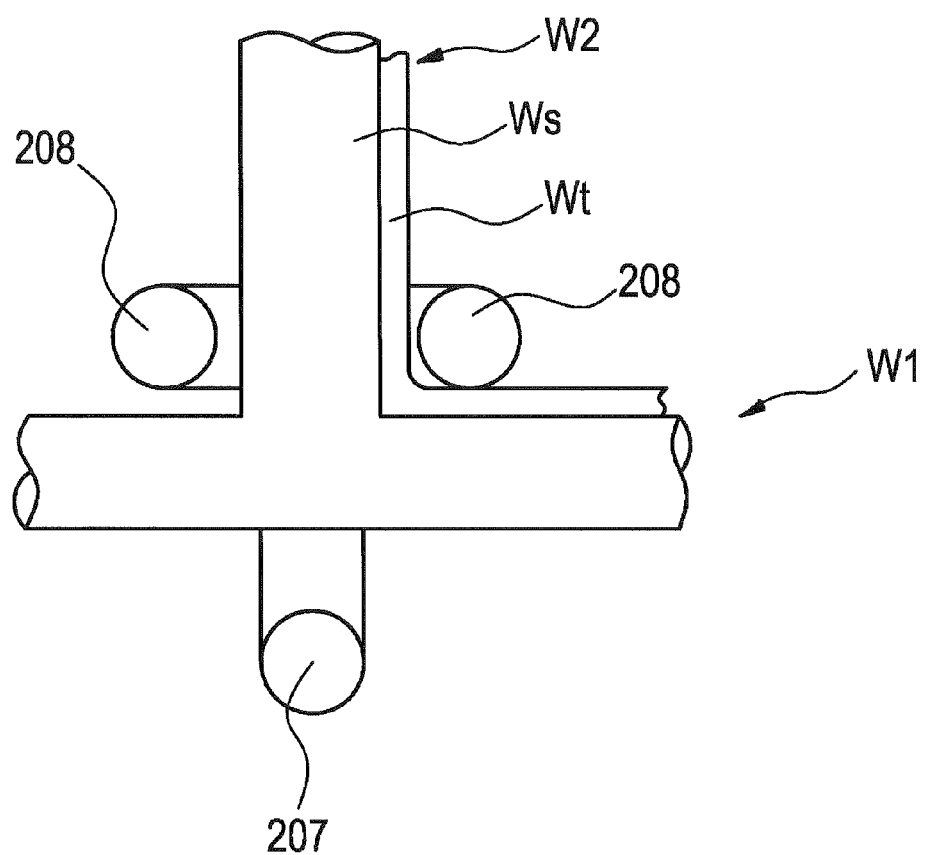
FIG. 10 is a top view which describes a traditional method of wiring a branch part.
Figure 11:
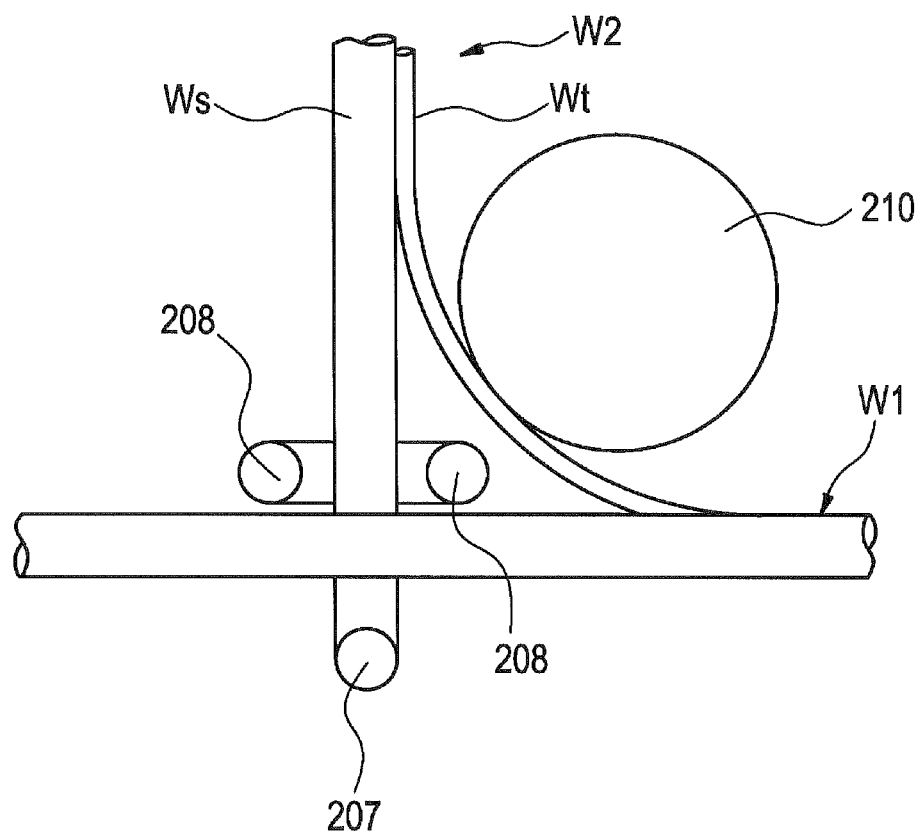
FIG. 11 is a top view which describes the traditional method of wiring the branch part when a special wire is contained.

FIGS. 6(a) to 6(c) show the construction of a holding fixture 100 of the sixth embodiment of the invention, in which FIG. 6(a) is a top view, FIG. 6(b) is a VIb-VIb arrow view of FIG. 6(a), and FIG. 6(c) is a VIc-VIc arrow view of FIG. 6(a). FIGS. 7(a) to 7(d) show the construction of a bottom plate 110 which forms the holding fixture 100 shown in FIGS. 6(a) to 6(c), in which FIG. 7(a) is a top view, FIG. 7(b) is a VIIb-VIIb arrow view of FIG. 7(a), FIG. 7(c) is a VIIc-VIIc arrow view of FIG. 7(a), and FIG. 7(d) is a VIId-VIId arrow sectional view of FIG. 7(a). FIGS. 8(a) to 8(d) show the construction of a top plate 120 which forms the holding fixture 100 shown in FIGS. 6(a) to 6(c), in which FIG. 8(a) is a top view, FIG. 8(b) is a VIIIb-VIIIb arrow view of FIG. 8(a), FIG. 8(c) is a VIIIc-VIIIc arrow view of FIG. 8(a), and FIG. 8(d) is a VIIId-VIIId arrow sectional view of FIG. 7(a). FIG. 9 is a top view which shows that by using the holding fixture 100 shown in FIGS. 6(a) to 6(c) to perform the wiring of a wire harness, a T-shaped branch part is formed.

The holding fixture 100 of the wire harness branch part, as shown in FIG. 9, is a member for producing the T-shaped wire harness branch part in which branch wires W2 are branched in a direction which intersects trunk wires W1 of a wire harness (a direction perpendicular to the trunk wires W1 in the figure) from the trunk wires W1 and for holding the wire harness branch part in a produced state.

The holding fixture 100 has a board 101 which is roughly T-shaped when viewed from top, a trunk wire guiding part 102 which is provided on the board 101 and guides the trunk wires W1, special wire branching and guiding parts 103 which are provided on the board 101, makes the special wires Wt, which are those wires among the branch wires W2 whose minimum bending radius is restricted, to be curved into an arc shape in a direction which intersects the trunk wires W1, and guide the special wires Wt, and a regular wire branching and guiding part 104 which is provided on the board 101 and guides regular wires Ws except the special wires among the branch wires W2. The special wire branching and guiding parts 103 are provided in a right-left symmetric way at the two sides of a line perpendicular to the trunk wire guiding part 102, and the regular wire branching and guiding part 104 is provided on the above-mentioned perpendicular line. When it is necessary to wrap tapes, tape wrapped parts 105 are provided near two ends openings of the trunk wire guiding part 102 and near an opening of the regular wire branching and guiding part 104.

The holding fixture 100 in this case includes the bottom plate 110 and the top plate 120 which form the board 101 when the plates are combined mutually, as shown in FIGS. 6(a) to 8(d). Straight trunk wire guiding grooves 112 and 122 which form a course of the trunk wire guiding part 102, arc-shaped special wire branching and guiding grooves 113 and 123 which form courses of the special wire branching and guiding parts 103, and straight regular wire branching and guiding grooves 114 and 124 which form a course of the regular wire branching and guiding part 104, when the bottom plate 110 and the top plate 120 are combined, are formed on a board 111 of the bottom plate 110 and a board 121 of the top plate 120, respectively.

Herein, as shown in FIGS. 7(a) to 7(c), the special wire branching and guiding grooves 113 of the bottom plate 110 are formed at the lowest parts of V-shaped concave parts 115 which are formed along the special wire branching and guiding grooves 113. As shown in FIGS. 8(a) to 8(c), the special wire branching and guiding grooves 123 of the top plate 120 are formed at the highest parts of convex parts 125 having angle structures which are formed along the special wire branching and guiding grooves 123 and fit into the V-shaped concave parts 115 when the bottom plate 110 and the top plate 120 are combined.

Through holes 107 and 108, which position the holding fixture 100 on a wiring plate by being fitted to a plurality of support posts 207 and 208 (refer to FIG. 9) of a wiring jig of the wire harness, respectively, are provided in the boards 111 and 121 of the top plate 110 and the bottom plate 120.

Next, how to use the holding fixture 100 is described.

First, before a wiring operation, the through holes 107 and 108 of the bottom plate 110 of the holding fixture 100 are fitted to the support posts 207 and 208 of the wiring jig to set the holding fixture 100 to the wiring jig. In the wiring operation of the branch part, the trunk wires W1 of a wire harness are placed on the trunk wire guide groove 112, the regular wires Ws among the branch wires W2 are placed on the regular wire branching and guiding groove 114, and the special wires Wt are placed on the special wire branching and guiding grooves 113 where the minimum bending radius is secured. The top plate 120 is put on the bottom plate 110 after the wiring is completed.

At this time, the special wires Wt are received in the special wire branching and guiding grooves 113 and 123 where the minimum bending radius is secured automatically by the action of slopes when the convex parts 125 having angle structures of the top plate 120 fit into the V-shaped concave parts 115 of the bottom plate 110. In this state, the top plate 120 and the bottom plate 110 are fixed with locking mechanisms or binding bands which are arranged around. In this way, the T-shaped wire harness branch part held by the holding fixture 100 is completed.

According to the holding fixture 100 of the wire harness branch part, since the special wires Wt among the branch wires W2 whose minimum bending radius is restricted can be guided along the special wire branching and guiding grooves 113 and 123, it is possible to wire while the minimum bending-radius is secured. By fixing the top plate 120 and the bottom plate 110 as they are, for example, through tape wrapping, the wired state can be held in the minimum space. Therefore, while the wiring operation becomes easy, there is also no fear that the state at the time of wiring collapses before the wire harness is loaded onto a vehicle, and the loading space of the vehicle can also be reduced.

Since the regular wire branching and guiding part 104 which guides the regular wires Ws other than the special wires Wt among the branch wires W2 is provided, the regular wires Ws can also be branched reasonably at the same time.

Since the top plate 120 is put on the bottom plate 110 and the top plate 120 and the bottom plate 110 are fixed after the wire harness is wired on the bottom plate 110, the wire harness branch part can be stably held. Since the special wire branching and guiding grooves 113 of the bottom plate 110 are formed at the lowest parts of the V-shaped concave parts 115 and the special wire branching and guiding grooves 123 of the top plate 120 are formed at the highest parts of the convex parts 125 having angle structures which fit into the V-shaped concave parts 115 of the bottom plate, when the wire harness is wired on the bottom plate 110, and the top plate 120 is put on the bottom plate 110 after the wiring, the special wires Wt can be automatically fitted in the special wire branching and guiding grooves 113 along the slopes of the V-shaped concave parts 115, and the operation of wiring the special wires Wt becomes easier.

Since the through holes 107 and 108, which position the board 101 on the wiring plate by being fitted to the plurality of support posts 207 and 208 of the wiring jig of the wire harness, respectively, are provided in the board 101, the operation of wiring the wire harness including the special wires Wt can be performed by using the holding fixture 100 and using the existing wiring jig.

Since the special wire branching and guiding parts 103 are provided in a right-left symmetric way at the two sides of a line perpendicular to the trunk wire guiding part 102, it is possible to branch two systems of special wires Wt using both the special wire branching and guiding parts 103.

The present invention is not restricted to the above-described embodiments, and suitable modifications, improvements and the like can be made. Moreover, the materials, shapes, dimensions, numbers, placement locations, and the like of the components in the above embodiments are arbitrarily set as far as the invention can be attained, and not particularly restricted.

For example, although the special wires are branched into the shape of T in the direction perpendicular to the trunk wire guiding part in the above-mentioned embodiments, a construction is also possible that special wires are branched in a direction not perpendicular to the trunk wire guiding part. In this case, the special wires can be branched to the two side of a line in branching directions that intersect the trunk wire guiding part so that the minimum bending radius may become equal.

Although the invention is described in detail with reference to specific embodiments, it is apparent that various modifications and amendments may be made by those skilled in the art without departing from the spirit and scope of the invention.

This application is based on the Japanese patent application (patent application 2010-252074) filed on Nov. 10, 2010, whose content is incorporated herein by reference.

INDUSTRIAL APPLICABILITY

According to the present invention, special wires can be branched from trunk wires while the minimum bending radius is secured. In addition, by wrapping tapes while the special wires are kept as they are, the wired state can be held in the minimum space. Therefore, while the wiring operation including the tape wrapping becomes easy, there is also no fear that the state at the time of wiring collapses before the wire harness is loaded onto a vehicle, and the loading space of the vehicle can also be reduced.

DESCRIPTION OF THE SYMBOLS

W1 trunk wire
W2 branch wire
Ws regular wire
Wt special wire
10, 10B, 10C, 10D and 10E holding fixture
11 board
12 trunk wire guiding part
13 special wire branching and guiding part
15 tape wrapped part
16 circular hole (where a member is to be placed)
17 catching part
18 clip (fixing means)
19 jig (member)
100 holding fixture
101, 111 and 121 board
102 trunk wire guiding part
103 special wire branching and guiding part
104 regular wire branching and guiding part
112 and 122 trunk wire guiding groove
113 and 123 special wire branching and guiding groove
114 and 124 regular wire branching and guiding groove
107 and 108 through hole

The invention claimed is:

1. A holding fixture of a wire harness branch part in which branch wires are branched in a direction that intersects trunk wires of the wire harness from the trunk wires, comprising:
   a trunk wire guiding part that guides the trunk wires;
   a bottom plate and a top plate, wherein the bottom plate and the top plate are combined to form a board; and
   special wire guiding parts that make special wires, which are wires among the branch wires whose minimum bending radius is restricted, curve in a direction that intersects the trunk wires, and guide the special wires, wherein the special wire guiding parts are formed by arc-shaped walls that are concave when viewed from outside, wherein the arc-shaped walls are vertically provided on an upper surface of the board, wherein the special wires are wired along surfaces of the arc-shaped walls,
   wherein the bottom plate and the top plate comprise trunk wire guiding grooves that form a course of the trunk wire guiding part, and special wire guiding grooves that form courses of the special wire guiding parts, when the bottom plate and the top plate are combined,
   wherein the special wire guiding grooves of the bottom plate are formed at lowest parts of V-shaped concave parts that are formed along the special wire guiding grooves, and
   wherein the special wire guiding grooves of the top plate are formed at highest parts of convex parts having angle structures that are formed along the special wire guiding grooves and fit into the V-shaped concave parts when the bottom plate and the top plate are combined.

2. The holding fixture of the wire harness branch part according to claim 1, wherein the special wire guiding parts guide the special wires so that the minimum bending radiuses become equal, and are provided at two sides of a line that intersects the trunk wire guiding part.

3. The holding fixture of the wire harness branch part according to claim 1, wherein the surfaces of the arc-shaped walls comprise at least one of inner surfaces and outer surfaces.

4. The holding fixture of the wire harness branch part according to claim 1, wherein the board includes the trunk wire guiding part and the special wire guiding parts, wherein the arc-shaped walls are formed by wall surfaces of grooves that are provided at the board and extend along arc-shaped courses.

5. The holding fixture of the wire harness branch part according to claim 1, comprising:

a member configured to prevent the special wires from separating from the surfaces of the arc-shaped walls, the member comprising a jig configured to prevent the special wires from separating from the surfaces of the arc-shaped walls, wherein the board comprises a hole configured to receive the jig.

6. The holding fixture of the wire harness branch part according to claim 5, wherein the jig is a cylindrical jig, and wherein the hole is a circular hole configured to receive the cylindrical jig.

7. The holding fixture of the wire harness branch part according to claim 5, wherein the surfaces of the arc-shaped walls comprise inner surfaces of the arc-shaped walls, and the jig is configured to prevent the special wires from separating from the inner surfaces of the arc-shaped walls.

8. The holding fixture of the wire harness branch part according to claim 1, comprising a clip configured to engage with a fixing hole of a vehicle body panel, wherein the clip protrudes from a surface of the holding fixture.

9. The holding fixture of the branch part of the wire harness according to claim 1, comprising tape wound around the holding fixture in a cross-coupled way to prevent slack of the special wires, wherein the tape wound around the holding fixture in the cross-coupled way to prevent slack of the special wires is configured to prevent the special wires from separating from the surfaces of the arc-shaped walls.

10. A holding fixture of a branch part of a wire harness in which branch wires are branched in a direction that intersects trunk wires of the wire harness from the trunk wires, the holding fixture comprising:

a trunk wire guide part that guides the trunk wires;

a bottom plate and a top plate, wherein the bottom plate and the top plate are combined to form a board;

one or more special wire guide parts that guide special wires to curve in a direction that intersects the trunk wires, the one or more special wire guide parts being formed by arc-shaped walls that are concave when viewed from outside of the holding fixture, the arc-shaped walls being vertically provided on an upper surface of the board, the special wires comprising wires of the branch wires and having a restricted minimum bending radius, the special wires being wired along surfaces of the arc-shaped walls; and a clip configured to engage with a fixing hole of a vehicle body panel, wherein the clip protrudes from a surface of the holding fixture, wherein the board comprises through holes configured to be fitted to a plurality of support posts of a wiring jig of the wire harness, and wherein the top plate comprises special wire guiding grooves formed at highest parts of convex parts having angle structures formed along the special wire guiding grooves, wherein the angle structures fit into V-shaped concave parts when the bottom plate of the board and the top plate of the board are combined, the V-shaped concave parts being formed along the special wire guiding grooves.

11. The holding fixture of the branch part of the wire harness according to claim 10, wherein the board comprises a regular wire guiding part, which comprises a straight groove that guides regular wires other than the special wires among the branch wires.

\* \* \* \* \*

UNITED STATES PATENT AND TRADEMARK OFFICE
CERTIFICATE OF CORRECTION

| | | |
|---|---|---|
| PATENT NO. | : 9,090,215 B2 | Page 1 of 1 |
| APPLICATION NO. | : 13/890900 | |
| DATED | : July 28, 2015 | |
| INVENTOR(S) | : Kazuyuki Oiwa et al. | |

It is certified that error appears in the above-identified patent and that said Letters Patent is hereby corrected as shown below:

On the title page, item (54):
    Please delete "Holding Fixture or Wire Harness Branch Part" and replace with
    --Holding Fixture of Wire Harness Branch Part--

In the Specification, Column 1, Lines 1 & 2:
    Please delete "Holding Fixture or Wire Harness Branch Part" and replace with
    --Holding Fixture of Wire Harness Branch Part--

Signed and Sealed this
Twenty-third Day of February, 2016

Michelle K. Lee
*Director of the United States Patent and Trademark Office*